US008739129B1

(12) United States Patent
Mosterman et al.

(10) Patent No.: US 8,739,129 B1
(45) Date of Patent: May 27, 2014

(54) MULTI-DOMAIN UNIFIED DEBUGGER

(75) Inventors: Pieter J. Mosterman, Framingham, MA (US); Mehmet Yunt, Cambridge, MA (US); Murali Yeddanapudi, Watertown, MA (US); Jay Ryan Torgerson, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 903 days.

(21) Appl. No.: 12/254,052

(22) Filed: Oct. 20, 2008

Related U.S. Application Data

(63) Continuation of application No. 11/025,218, filed on Dec. 29, 2004, now Pat. No. 7,496,895.

(51) Int. Cl.
*G06F 9/44* (2006.01)
(52) U.S. Cl.
USPC ............................ 717/125; 717/128; 717/131
(58) Field of Classification Search
USPC .................................................. 717/124, 125
See application file for complete search history.

(56) References Cited

U.S. PATENT DOCUMENTS

| 5,548,717 | A * | 8/1996 | Wooldridge et al. ......... 717/124 |
|---|---|---|---|
| 5,652,869 | A * | 7/1997 | Herdeg et al. ................... 703/23 |
| 5,680,584 | A * | 10/1997 | Herdeg et al. ................... 703/22 |
| 5,870,588 | A * | 2/1999 | Rompaey et al. ............... 703/13 |
| 5,940,617 | A * | 8/1999 | Tamura ......................... 717/128 |
| 6,044,211 | A * | 3/2000 | Jain ............................. 716/102 |
| 6,112,298 | A * | 8/2000 | Deao et al. .................... 712/227 |
| 6,618,854 | B1 * | 9/2003 | Mann ........................... 717/124 |
| 6,694,290 | B1 * | 2/2004 | Apfelbaum et al. ............ 703/22 |
| 6,754,889 | B1 * | 6/2004 | Leverenz ...................... 717/127 |
| 6,801,881 | B1 * | 10/2004 | Shah ............................... 703/2 |
| 6,826,746 | B2 * | 11/2004 | Evans et al. .................... 717/124 |
| 6,853,963 | B1 * | 2/2005 | Apfelbaum et al. ............ 703/2 |
| 6,912,708 | B2 * | 6/2005 | Wallman et al. ............... 717/128 |
| 6,986,124 | B1 * | 1/2006 | Field et al. .................... 717/124 |
| 7,043,415 | B1 * | 5/2006 | Dunlavey et al. ............... 703/12 |
| 7,082,386 | B2 * | 7/2006 | Srinivasa ......................... 703/2 |
| 7,149,929 | B2 * | 12/2006 | Chaurasia .................. 714/38.11 |
| 7,200,839 | B2 * | 4/2007 | Kadlecik et al. .............. 717/124 |
| 7,243,338 | B2 * | 7/2007 | Sethi et al. .................... 717/128 |
| 2002/0112225 | A1 * | 8/2002 | Charisius et al. ............ 717/125 |
| 2003/0028861 | A1 * | 2/2003 | Wallman et al. .............. 717/128 |
| 2003/0056199 | A1 * | 3/2003 | Li et al. ......................... 717/127 |
| 2003/0084127 | A1 * | 5/2003 | Budhiraja et al. ............ 709/220 |
| 2003/0182334 | A1 * | 9/2003 | Ryu ............................... 708/160 |
| 2003/0204838 | A1 * | 10/2003 | Caspole et al. ............... 717/130 |
| 2004/0015911 | A1 * | 1/2004 | Hinsley et al. ................ 717/147 |

(Continued)

*Primary Examiner* — Wei Zhen
*Assistant Examiner* — Matthew Brophy
(74) *Attorney, Agent, or Firm* — Nelson Mullins Riley & Scarborough LLP

(57) ABSTRACT

A Unified Debugger that enables the debugging of graphical models with combinations of entities from multiple domains such as time-based block diagrams, statecharts, and physical system models, with additional features for the debugging of hand-written and automatically generated code is disclosed. A view of the entity being executed that is consistent with the type of the modeling domain to which the entity currently being executed belongs is automatically generated for a user. Rather than requiring a user to manually transition from one debugger to the next, the Unified Debugger applies the appropriate debugging features from each modeling domain. The Unified Debugger also enables integration of diagnostic information from a multitude of modeling domains into a central user interface. In addition, a standard diagnostic interface which spans a plurality of modeling domains is defined that enables the customization of debug behavior.

34 Claims, 11 Drawing Sheets

(56) References Cited

U.S. PATENT DOCUMENTS

| | | | |
|---|---|---|---|
| 2004/0073413 A1* | 4/2004 | Aberg et al. | 703/2 |
| 2004/0088678 A1* | 5/2004 | Litoiu et al. | 717/104 |
| 2004/0172623 A1* | 9/2004 | Eckels et al. | 717/125 |
| 2006/0112382 A1* | 5/2006 | Glass et al. | 717/168 |
| 2007/0079257 A1* | 4/2007 | Vignet | 715/853 |

* cited by examiner

Fig. 4B

MULTI-DOMAIN UNIFIED DEBUGGER

RELATED APPLICATION

This application is a continuation of U.S. patent application Ser. No. 11/025,218, filed Dec. 29, 2004, the entire content of which is incorporated by reference.

FIELD OF THE INVENTION

The illustrative embodiment of the present invention relates generally to the debugging of executed block diagram models, and more particularly to the debugging of block diagram models containing entities from multiple types of modeling domains using a Unified Debugger.

BACKGROUND

Block diagrams are used to model real-world systems. Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), and weather and climate pattern systems. Examples of man-made or engineered dynamic systems include: a bouncing ball, a spring with a mass tied on an end, automobiles, airplanes, control systems in major appliances, communication networks, audio signal processing, nuclear reactors, and a stock market.

A block diagram model of a dynamic system is represented schematically as a collection of blocks interconnected by lines that represent signals. A signal represents the input and output of a dynamic system. Each block represents an elemental dynamic system. A line emanating at one block and terminating at another signifies that the output of the first block is an input to the second block. Each distinct input or output on a block is referred to as a port. Signals correspond to the time-varying quantities represented by each line connection and are assumed to have values at each time instant at which the connecting blocks are enabled. The source block of a signal writes to the signal at a given time instant when its system equations are solved. The destination blocks of this signal read from the signal when their system equations are being solved.

Time-based block diagram models may be thought of as relationships between signals and state variables representative of a dynamic system. The solution (computation of system response) of the model is obtained by evaluating these relationships over time. The time-based relationship may start at a user-specified "start time" and end at a user-specified "stop time", or the evaluations may continue indefinitely. Each evaluation of these relationships is part of a time step. Signals represent quantities that change over time, and these quantities are defined for all points in time between the block diagram's start and optional stop time. The relationships between signals and state variables are defined by sets of equations represented by blocks. These equations define a relationship between the input signals, output signals, state, and time.

It should be noted that the term "block diagram" as used herein is also used to refer to other graphical modeling formalisms. For instance, flow-charts are block diagrams of entities that are connected by relations. Flow-charts are used to capture process flow and are not generally suitable for describing dynamic system behavior. Data flow block diagrams are diagrams of entities with relations between them that describe a graphical programming paradigm where the availability of data is used to initiate the execution of blocks, where a block represents an operation and a line represents execution dependency describing the direction of data flowing between blocks. It will be appreciated that a block diagram model may include entities that are based on other modeling domains within the block diagram. A common characteristic among these various forms of block diagrams is that they define semantics on how to execute them.

As noted above, professionals from diverse areas such as engineering, science, education, and economics build computational models of dynamic systems in order to better understand system behavior as it changes with the progression of time. The computational models aid in building "better" systems, where "better" may be defined in terms of a variety of performance measures such as quality, time-to-market, cost, speed, size, power consumption, robustness, etc. The computational models also aid in analyzing, debugging and repairing existing systems (be it the human body or the anti-lock braking system in a car). As systems become more complex, an increasingly large amount of time and effort is involved in creating accurate, detailed models. These models are typically hybrid dynamic systems that span a variety of domains, including continuous dynamics and discrete behavior, physical connections, and event-driven states. To add to the complexity, these systems may be depicted in a number of ways, including dynamic or physics block diagrams, finite state machines, and hand-written or automatically generated computer code.

To identify a cause when a model does not execute as expected, or when its execution time needs to be improved, detailed information about its execution has to be available. Unfortunately, this level of detail is not usually available as the display and the accessibility of such detailed information introduces significant execution overhead. Instead, the model can be run in a distinct 'debug' mode, where the additional information is exposed, but at the cost of execution speed. In order to debug the system behavior, the modeler must not only understand the inner workings of each piece of a model, but also how these different pieces interact. For example, the dynamic model could cause a transition in the finite state machine, or part of the dynamic system may be implemented in computer code, which is simulated in conjunction with the remainder that is modeled in the block diagram.

Currently, debugging tools exist that allow modelers to debug individual portions of their model from different modeling domains. Individual existing debuggers can walk the user through a dynamic block diagram, or show the transition order in a finite state machine, or step through running computer code. Unfortunately, the individual debuggers do not work together as a seamlessly integrated tool over multiple domains. This presents a number of problems. The modeler has to manually transition from one debugger to the next, losing the context of where they are in their system. Additionally, conventional debuggers provide no information about how the different domains of the system work together.

BRIEF SUMMARY

The illustrative embodiment of the present invention provides a multi-domain Unified Debugger that enables the debugging of graphical models with combinations of entities from multiple domains such as time-based block diagrams, statecharts, and physical system models, with additional features for the debugging of hand-written and automatically generated code. A view of the entity being executed that is consistent with the type of the modeling domain to which the entity currently being executed belongs is automatically generated for a user. Rather than requiring a user to manually transition from one debugger to the next, the Unified Debugger applies the appropriate debugging features from each modeling domain. The Unified Debugger also enables integration of diagnostic information from a multitude of modeling domains into a central user interface. In addition, a standard diagnostic interface which spans a plurality of modeling domains is defined that enables the customization of debug behavior.

In one embodiment in a computational device, a system for debugging a multi-domain block diagram includes a plurality of Debuggable Objects based on entities found in a graphical model. Each of the Debuggable Objects includes a standard interface for multiple separate execution domains. The system also includes a Unified Debugger. The Unified Debugger integrates the multiple Debuggable Objects into a common diagnostic environment for a user.

In another embodiment in a computational device with a block diagram environment, a method of debugging a multi-domain block diagram includes the step of providing multiple Debuggable Objects (DBOs) associated with entities found in a block diagram model. The block diagram model includes entities from multiple types of modeling domains. Each of the DBOs includes a standard interface for the multiple modeling domains. The method also includes the step of providing a Unified Debugger that integrates multiple DBOs into a common diagnostic environment for a user. The common diagnostic environment displays multiple views of the block diagram to a user. The views are consistent with the modeling domain of an entity being executed. The method additionally includes the step of executing the block diagram. The Unified Debugger provides a view of the execution to the user.

In an embodiment, a distributed system for debugging multi-domain block diagrams includes a server hosting a block diagram environment with at least one block diagram model. The block diagram model includes entities from multiple modeling domains. The entities in the block diagram model are associated with multiple Debuggable Objects (DBOs). Each DBO includes a standard interface for the multiple modeling domains. The block diagram environment includes a Unified Debugger which integrates environments for debugging the multiple DBOs into a common diagnostic environment for a user. The common diagnostic environment generates multiple views of the block diagram to the user. The system also includes a client device in communication with the server over a network. The client device requests the initiation of an execution of the block diagram model in response to a user request. The system also includes a display device in communication with the client device. The display device displays the multiple views generated by the server during an execution of the block diagram model.

In another embodiment in a computational device with a graphical model execution environment, a medium holds computer-executable steps for a method of debugging a graphical model, the method includes the step of providing a model view of a graphical model being executed, the model view showing multiple entities from multiple execution domains. The method further includes the step of generating an execution list view of the entities in the model diagram. The method additionally includes the step of integrating the model view and the execution list view into a common diagnostic environment. The common diagnostic environment includes a unified debugger for the multiple execution domains.

In an embodiment, in a computational device with a graphical modeling environment, a method of debugging a multi-domain block diagram model includes the step of providing a standard interface for multiple entities found in a graphical model, the graphical model including entities from multiple different types of modeling domains. The method also includes the step of providing a unified debugger, the unified debugger integrating information acquired for debugging for the plurality of entities into a common diagnostic environment for a user. The debug information is acquired using the standard interface. The common diagnostic environment displays multiple views of the graphical model to a user consistent with the modeling domain of an entity being executed. The method additionally includes the step of executing the graphical model, the unified debugger providing a view of the execution to the user.

BRIEF DESCRIPTION OF THE DRAWINGS

FIG. 4B is a depiction of a user interface transitioned to by the illustrative embodiment of the present invention to present a model execution view and a source code model view for the model of FIG. 4A upon detecting an entity from a different modeling domain during an execution;

FIG. 5A and FIG. 5B depict the synchronization between views displayed by the Unified Debugger in the illustrative embodiment of the present invention, wherein FIG. 5A shows run-time debug information and FIG. 5B depicts the run-time debug information displayed on an associated entity in the block diagram model view;

DETAILED DESCRIPTION

The illustrative embodiment of the present invention provides a Unified Debugger that integrates debugging and diagnostic information from multiple modeling domains that are referenced by entities in a block diagram. The multiple modeling domains include time-based block diagrams, statecharts, data flow diagrams and compiled code. The Unified Debugging environment is able to display domain appropriate views to a user automatically based upon the entity in the block diagram being debugged. Additionally, a standard diagnostic interface embodied in a block diagram debuggable object is defined allowing access to information from the multiple types of modeling domains. The use of the standard diagnostic interface enables the customization of debug behavior at the block diagram functional level.

Figure 1A:
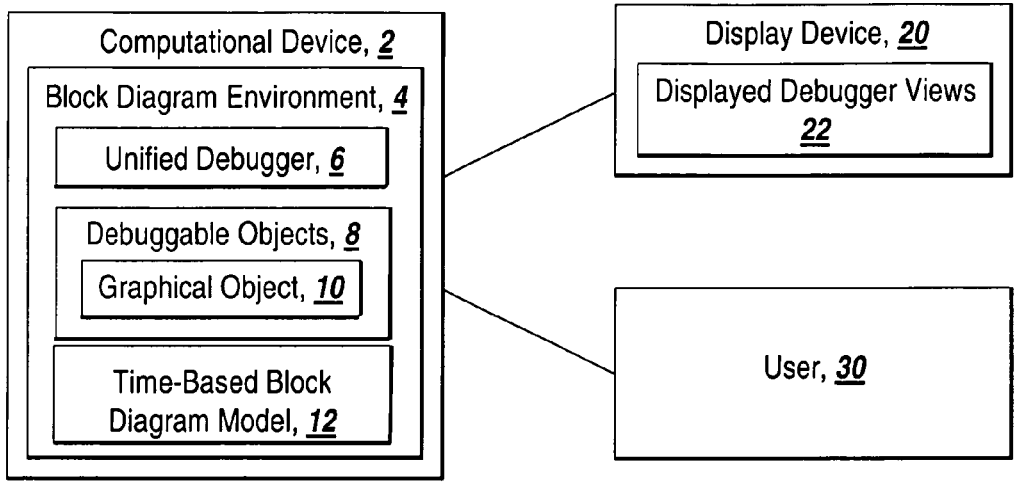
FIG. 1A is a block diagram of an environment suitable for practicing the illustrative embodiment of the present invention.

FIG. 1A depicts an environment suitable for practicing the illustrative embodiment of the present invention. A computational device 2 includes a graphical modeling environment such as the depicted block diagram environment 4. The computational device 2 may be a server, workstation, laptop, PDA or other device equipped with a processor and capable of supporting a graphical modeling environment. The block diagram environment 4, such as SIMULINK from The MathWorks, Inc. of Natick, Mass. or other graphical modeling environment, includes the Unified Debugger 6 of the present invention. The Unified Debugger 6 processes multiple Debuggable Objects 8. The Debuggable Objects 8 include one or more graphical objects 10. The Unified Debugger 6, Debuggable Block Diagram Objects 8 and graphical objects 10 are discussed in more detail further below. The block diagram environment 4 has access to at least one graphical model such as the depicted time-based block diagram model 12. The time-based block diagram model 12 includes entities from at least two modeling domains, such as entities from time-based block diagrams, statecharts, data flow diagrams and compiled code. The Unified Debugger 6 executes the time-based block diagram model 12 and generates displayed debugger views 22 on the display device 20. A user 30 views the display device 20 and accesses the computational device 2.

It should be understood that although FIG. 1A depicts a block diagram environment 4 and a time-based block diagram model 12 that includes entities from multiple different modeling domains, other implementations are possible within the scope of the illustrative embodiment of the present invention. For example, the Unified Debugger may be used in conjunction with a graphical model that is a state chart model that includes compiled code entities. Those skilled in the art will recognize that many other combinations of graphical models that include model entities from different domains are also possible within the scope of the present invention.

Figure 1B:
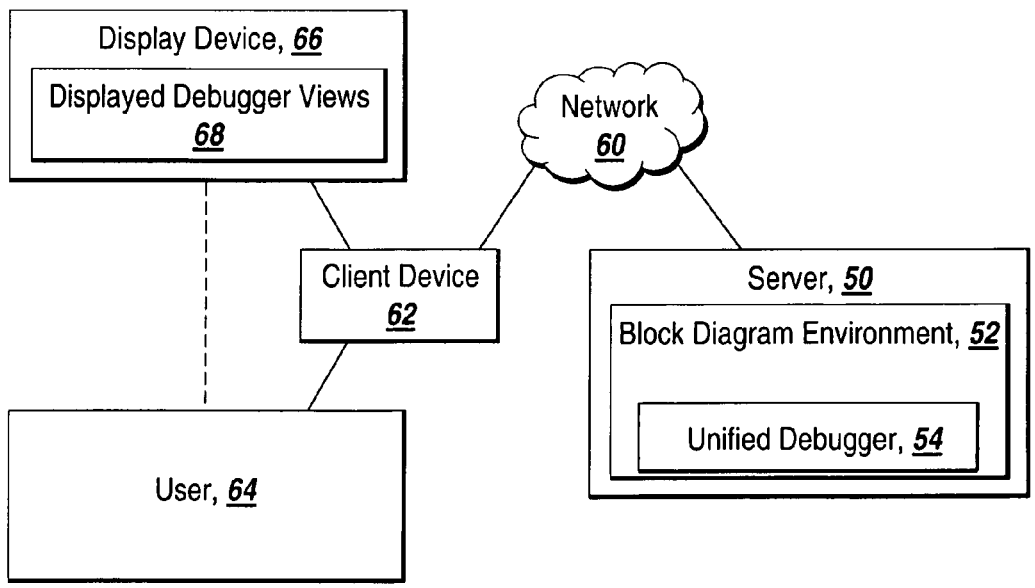
FIG. 1B is a block diagram of an alternative environment suitable for practicing the illustrative embodiment of the present invention.

The Unified Debugger of the present invention may also be implemented using a distributed architecture. FIG. 1B depicts an alternate distributed environment for practicing the illustrative embodiment of the present invention. A server 50 is interfaced with a network 60. The network 60 may be the Internet, an intranet, a local area network (LAN), a wide area network (WAN), or some other types of network. The server 50 hosts a graphical modeling environment such as the depicted block diagram environment 52 and the Unified Debugger 54 of the present invention. A client device 62 is in communication with a server 50 over a network 60. The client device 62 is in communication with a display device 66 upon which the displayed debugger views 68 that are generated by the Unified Debugger 54 are displayed. A user 64 is in contact with the client device 62 and views the display device 66. Those skilled in the art will recognize that other architectures may be utilized without departing from the scope of the present invention such as by retrieving the model being executed by the block diagram environment 52 from various locations accessible over the network 60.

The illustrative embodiment of the present invention includes two major elements. The Debuggable Object (DBO) 8 embodies the standard interface among the separate execution domains while the Unified Debugger integrates diagnostics and debugging functionality for a plurality of modeling domains and technologies. Execution of a graphical model can be done in the form of a simulation (such as normal or accelerated mode of simulation in SIMULINK) or in real-time in a test bed or in production environment (such as SIMULINK External Mode). The Unified Debugger requires a standard interface across all unified domains to be defined in order to enable cross-domain interaction and communication. The DBOs enable the Unified Debugger to function as if there is not a plurality of domains and entities but rather multiple standard objects. As a result, the Unified Debugger is only required to have the functionality to process DBOs and does not need to embody domain specific functionality.

A DBO encompasses a functional element in a block diagram execution such as (but not limited to) a block, a state machine, a mechanical machine or the algebraic and differential equation solver. All of the semantic elements of a block diagram and the execution engine can be represented as a DBO or multiple DBOs. The DBO also encompasses the graphical representation of the functional elements such as block icons on the block diagram or the display of integration information of the solvers on the debugger user interface.

DBOs implement certain capabilities and expose them to the Unified Debugger. One of the capabilities of the DBO is the registration of embodied methods with the Unified Debugger. A DBO has methods that are called during the execution of a block diagram. The Unified Debugger is informed of the available methods at the start of debugging to enable the user to set breakpoints on these methods. The registration functionality enables the DBO to inform the Unified Debugger of the plurality of available methods and enables the DBO to acquire identifiers to locate its methods in a master method list, which the Unified Debugger compiles at initialization of the debugging session. The DBO also acquires the necessary callback mechanism to inform the Unified Debugger of its currently executing method.

Figure 2A:
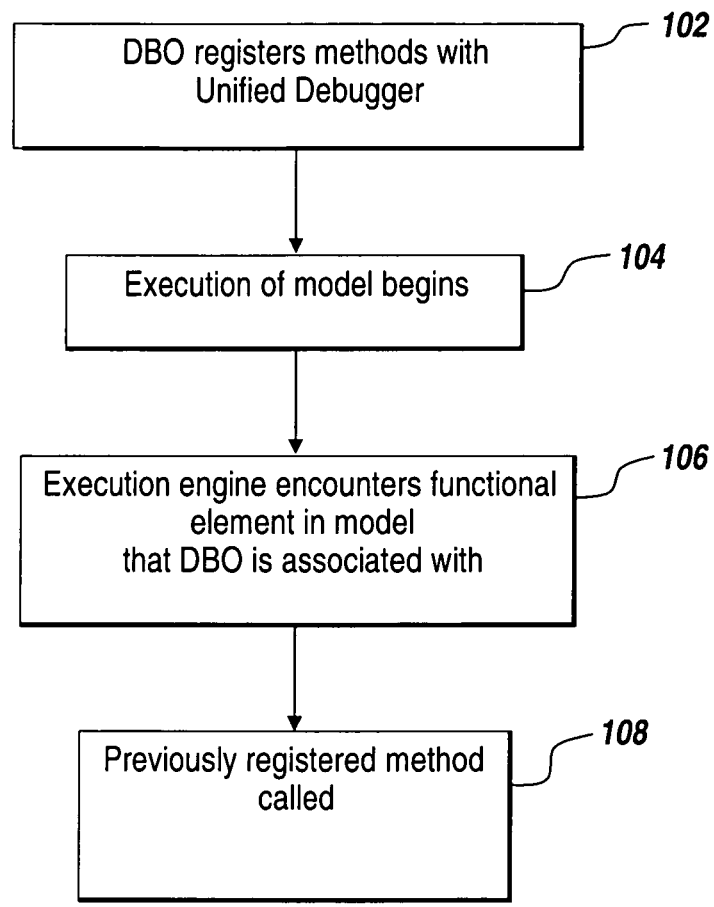
FIG. 2A is a flow chart of the steps followed by a DBO in the illustrative embodiment of the present invention to register methods with the Unified Debugger.

FIG. 2A depicts the sequence of steps followed by the illustrative embodiment of the present invention to utilize DBO methods. The sequence begins when the DBO registers methods with the Unified Debugger (step 102). Execution of the model then begins (step 104) and continues until the execution engine encounters a functional element in the model with which the DBO is associated and for which the DBO registered a method (step 106). The previously registered methods are then called by the Unified Debugger 6 (step 108). The registration of DBO methods with the Unified Debugger may also take place during run-time, such as during a break in execution of a model.

In addition to registering methods, the DBOs may also register domain specific execution events such as division by zero in the solvers, zero crossings, negative square roots and inconsistent state transitions. Each DBO needs to register such events with the Unified Debugger in order for the event to be exposed to the user. The registration functionality informs the Unified Debugger of the presence of an event and its name, in return the DBO acquires the means to inform the Unified Debugger to stop execution or perform another specified action in case of an event occurrence.

Figure 2B:
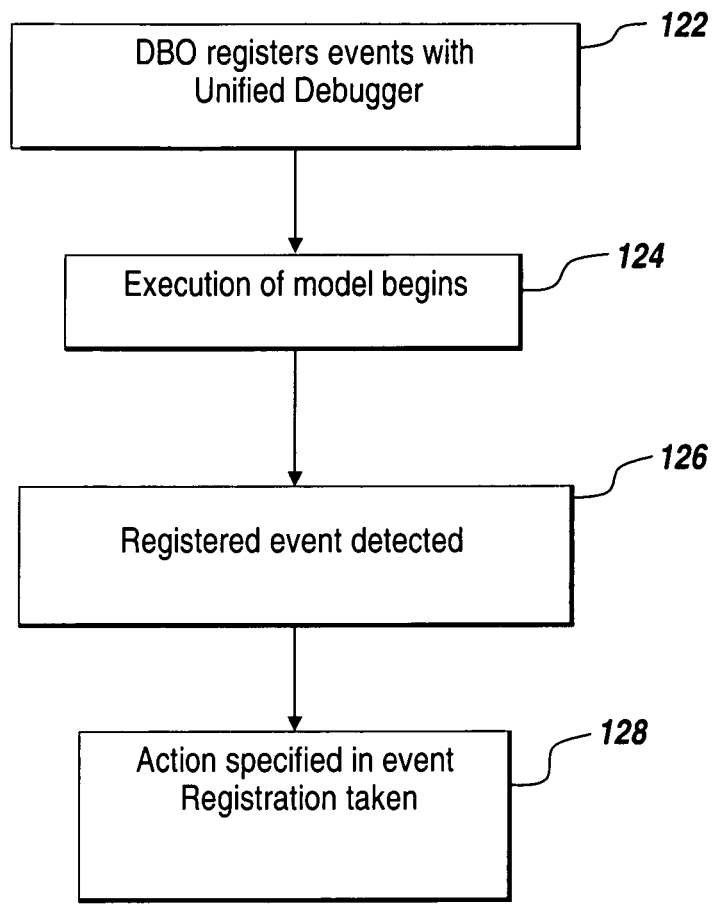
FIG. 2B is a flow chart of the steps followed by a DBO in the illustrative embodiment of the present invention to register events with the Unified Debugger.

FIG. 2B depicts the sequence of steps followed by which the DBOs of the illustrative embodiment of the present invention may utilize events to trigger actions during the execution of the model. The sequence begins when the DBO registers events with the Unified Debugger (step 122). Execution of the model then begins (step 124) and continues until a registered event is detected (step 126). The registered event may be the entry to, or exit from, a method. An action that was specified during the event registration is then performed (step 128). The registration of events with the Unified Debugger may also take place during run-time, such as during a break in execution of a model.

Similarly, the DBO can register commands specific to itself with the Unified Debugger. These commands appear on the user interfaces and become active as execution passes through the DBO. At the initialization of debugging, the commands are registered with the Unified Debugger. The commands are private functions of the DBO, and the Unified Debugger calls the DBO to execute the additional or the overridden commands.

The DBOs may also inform the Unified Debugger of a currently executing method: A DBO that contains at least one method informs the debugger of entry to and exit from that method. A method is any action of a DBO that has significance for the user and has a label. A method needs to have a well-defined exit and entry point. For instance, a transition from one state to another may be a method for a finite state machine. This functionality is implemented using the callback and identifiers acquired during the registration of available methods. A callback is called when the debugging engine during execution of the model encounters a functional element that includes a previously registered method.

Similarly, DBOs may include means to communicate via a protocol with the Unified Debugger and other DBOs. A DBO can communicate with other DBOs that are registered with the debugger. The DBO has the functionality to acquire access to the available DBOs and register itself with other DBOs to be called when certain events happen. For instance, the nonlinear solver used for algebraic loops in a time-based block diagram can call the ordinary differential equation solver in case the nonlinear solver is unable to find a solution to display solver information. In this example, the nonlinear solver and the ordinary differential equation are encompassed in separate DBOs. The registration of events and methods is also accomplished using the same communication means. The communication between the DBOs and the DBOs with the Debugger requires the definition of a message passing interface and a set of standard message constructs and a dictionary to be used. For the creation of message constructs, XML may be used.

The DBO is also responsible for exposing the data that the user can see. A DBO associated with an entity may display the output and input values, the DBO of a machine model may display the forces or accelerations. The Unified Debugger asks the DBO for data to be displayed and the DBO returns the data and how it should be displayed through the message passing interface. The DBO additionally determines how debug information is displayed on the model view and the Debugger User Interface. Each DBO has a schema file that may define the structure of the data, the types of data and the attributes of the data that the Debugger uploads at initialization or refers to when necessary. The DBO communicates to the Unified Debugger how and where on the UI debug information is supposed to be displayed.

In addition to the functionality discussed above, the DBOs may also have the properties of aggregation and inheritance. Thus, a DBO can include other DBOs. For instance, a DBO can be created for an algebraic loop in a time-based block diagram and it can include the DBOs of the blocks in the algebraic loop and the DBO of the nonlinear equation solver employed to solve the algebraic loop. The algebraic loop DBO is responsible for transmitting messages coming from the Debugger to its members and the messages from its members to the Debugger. Likewise, a DBO can inherit from one or multiple parents, properties and functionality. For example, the SIMULINK, STATEFLOW and SIMMECHANICS domains have DBOs that define the default behavior for any DBO in that domain. A child DBO can inherit the properties and functionality and then overwrite some or all of the default behavior to specify more specific behavior for the child DBO.

It should be noted that the inheritance hierarchy may be extended to include other domains because of the standardized Debuggable Object. Each of the domains customizes the object methods to be tailored to its debug requirements. The inheritance hierarchy allows more specific implementations by another level of inheritance to define detailed semantic elements within the SIMULINK domain such as blocks and the solver. For example, SIMULINK may implement a method to obtain the owner of a DBO, while the blocks and solver may specialize in highlighting its graphical object area. Furthermore, the graphical properties of DBOs can also be arranged in an inheritance hierarchy.

The default graphical properties of domains are specified by graphical objects for each domain (such as the SIMULINK, STATEFLOW and SIMMECHANICS domains which are all software packages available commercially from The MathWorks, Inc.) and other domains with discrete events and data flow. More specific display functionality is incorporated in the child objects. Inheritance allows the Unified Debugger to find subsets of DBOs to process. For example, in the situation where the Unified Debugger needs to set an option that controls the format of the numerical information displayed on all SIMULINK domain DBOs, an inheritance hierarchy allows the Unified Debugger to search for all DBOs that are SIMULINK DBOs and set the necessary format options.

It will be appreciated by those skilled in the art that although the illustrative embodiment of the present invention has been described as including the use of DBOs in an object-oriented environment, similar functionality may also be provided in non-object oriented environments. The provision of the common interface to multiple different modeling domains (that is provided by the DBOs of the present invention) using non-object-oriented data structures should be understood to be within the scope of the present invention. Similarly, the use of a Unified Debugger in a non-object oriented environment is also within the scope of the present invention.

Figure 3:
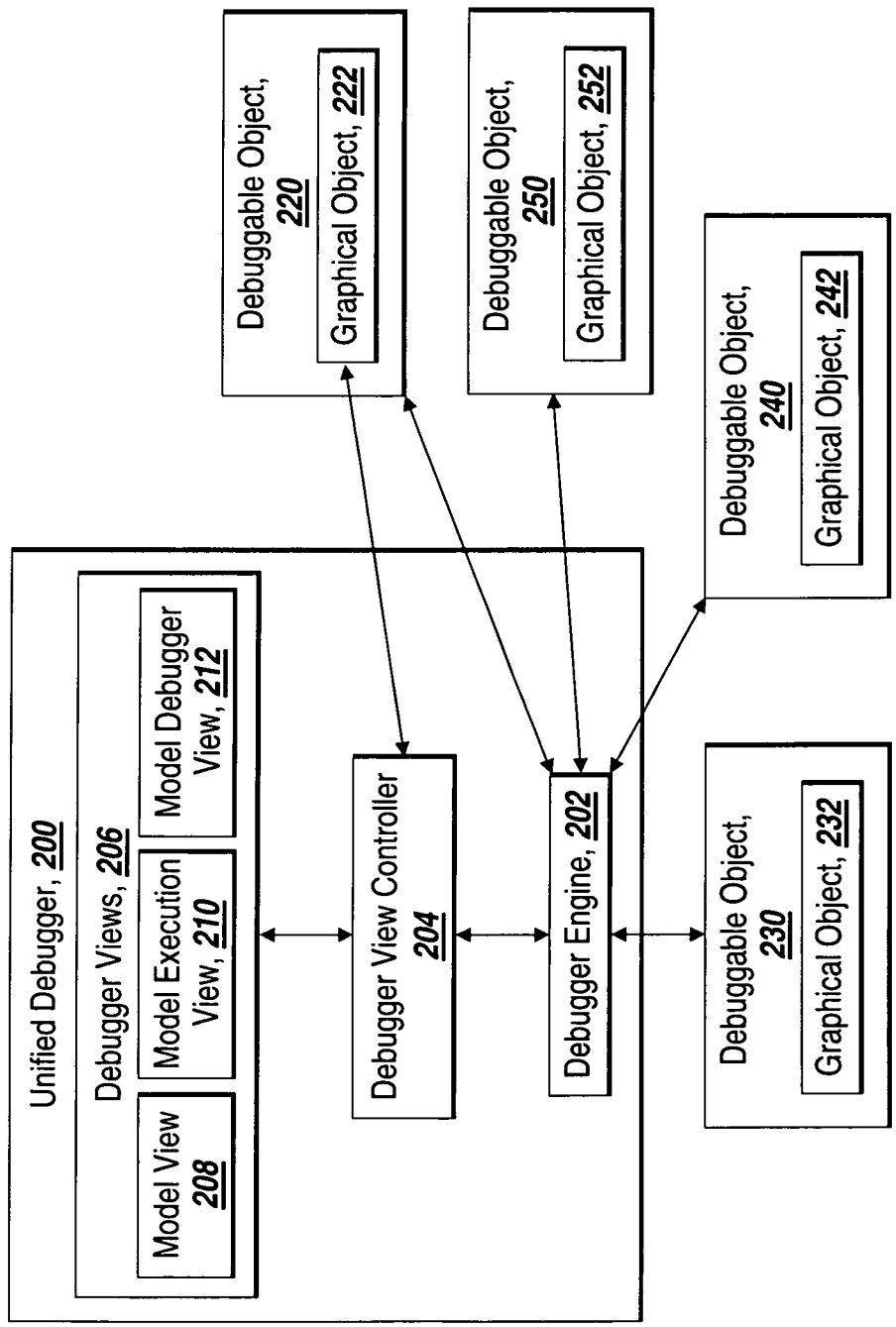
FIG. 3 is a block diagram of the Unified Debugger utilized by the illustrative embodiment of the present invention.

The Unified Debugger integrates the DBOs into a common diagnostic environment for the user. The Unified Debugger embodies the necessary functionality to process information coming from DBOs and relay information between DBOs and the graphical user interface elements. FIG. 3 depicts the Unified Debugger of the present invention. The Unified Debugger 200 includes a debugger engine 202, a debugger view controller 204 and a plurality of debugger views 206. The debugger views 206 may include but are not limited to a model view 208, a model execution view 210, and a model debugger view 212. The debugger view controller 204 determines how debug information is provided to a user and is in communication with the debugger engine 202. The Unified Debugger 200 processes a plurality of Debuggable Objects 220, 230, 240, and 250. In this case, each of the DBOs include graphical objects 222, 232, 242, and 252. The DBOs provide a standard interface to the Unified Debugger allowing cross-domain interaction and communication.

Examining the Unified Debugger 200 in more detail, the debugger engine 202 is responsible for communication with the DBOs 220, 230, 240 and 250. The DBOs 220, 230, 240 and 250 keep the Unified Debugger 200 informed of the progress of model execution by notifying the Unified Debugger of the entry and exit to a particular DBO method. The Debugger Engine is also responsible for relaying messages between DBOs that are not in the same aggregate DBO. A DBO sends a message to be posted to the Debugger Engine 202 which in return informs all other DBOs of this message. The posting DBO can also specify the type of DBO to which the message should be sent, in which case the Debugger Engine 202 sends the message to the DBOs of the selected type.

The Debugger Engine 202 is also responsible for relaying data requests from the Debugger View Controller 204 to the appropriate DBO. The Debugger Engine 202 also returns the requested data to the Debugger View Controller 204 from the DBO. The Debugger Engine 202 keeps a database of the methods that have executed in an order that preserves the call chain of each method. Additionally, the Debugger Engine 202 checks for interruptions to model execution such as break points, stores break points and events, and stores profiling information related to model execution.

The profiling information relates to the number of times a certain method has executed so far in a given execution cycle. The illustrative embodiment of the present invention allows this information to be obtained by keeping a counter for each method and showing it next to each method of the block diagram in a tree view or by displaying the value of the counter on a related block in the model (either as a number or by some other graphical means). The counter may be reset to 0 at the start of every major time step.

On the records for each unique method invocation the following profiling data may be stored:

1. The number of times a unique method invocation was invoked during model execution. This is a counter that is incremented every time the unique method invocation occurs.
2. The number of times a unique method invocation was executed per time step of a model execution. This is a counter that is incremented every time the unique method was invoked, but it is reset to zero at the start of each time step
3. The last time of entry to a unique method invocation. The debugger records the last time in the record of a unique method invocation before execution leaves the debugger and enters the execution engine.
4. The last time of exit from a unique method invocation. The debugger records the time the debugger is entered immediately after the method is executed.
5. The duration of method execution. This is the difference between time of last entry and last exit and is calculated immediately after last exit is recorded. This number can be the actual recent difference or an average of the past durations to accommodate any abnormal measurements.
6. The total duration of method execution. This record keeps the total time the execution engine spent executing this unique method invocation in real-time.

The profiling data that is collected may be further processed to calculate the following:

1. The total number of times a method of a certain owner has been executed: The unique method invocations are traversed and the total number of times recorded for each record that has the specified owner and method is summed. This information can be stored on the owner as a field as well.
2. The total of times a method of a certain owner has been executed in a time step: The unique method invocations are traversed and the total number of times per time step is recorded for each record that has the specified owner and the method is summed. This information is stored on the owner as a field as well.
3. The total duration over a time step for a method of a certain owner: The duration of execution for each record with the given method and owner are summed. This information is stored on the owner as a field as well.
4. The total duration for a method of a certain owner: The total duration of execution for each record with the given method and owner are summed. This information is stored on the owner as a field as well.

The Unified Debugger merges profiling information with debug information from a block diagram for display to a user The Debugger View Controller 204 determines how a DBO 220, 230, 240 and 250 will be represented in the Debugger Views 206 by merging the data from the DBO via the Debugger Engine 202 with the specifications and schema coming from the Graphical Objects of each DBO. The Debugger View Controller 204 collects the user-desired execution debug information such as information contained with DBOs 220, 230, 240 and 250 from the Debugger Engine 202. The Debugger View Controller is also responsible for automatically switching between different display modalities of different modeling domains such as block diagram displays, statecharts, C/C++ code, HDL and three dimensional display (virtual reality) environments as well as switching between the display of modeling technologies, such as block diagrams, C/C++ source code and/or M. It should be noted that the Debugger View Controller may also provide debug information to a user through a non-visual mechanism such as by using sound or tactile feedback.

As noted above, the illustrative embodiment of the present invention supports multiple views of the model information. The Debugger Views 206 are user interface elements that display debug information of the model and allow the user to interact with the Unified Debugger 200. The Debugger Views 206 include the Model View 208, the Model Execution View 210 and the Model Debugger View 212. Those skilled in the art will recognize that additional views displaying data relating to the model being executed may be provided without departing from the scope of the present invention. The Model View 208 is the user interface element that contains the graphical representation of the model. The Model Execution View 210 is an interface displaying information about the elements of a model. The Model Debugger View 212 is the interface where the main user input to the Unified Debugger is received.

Figure 4A:
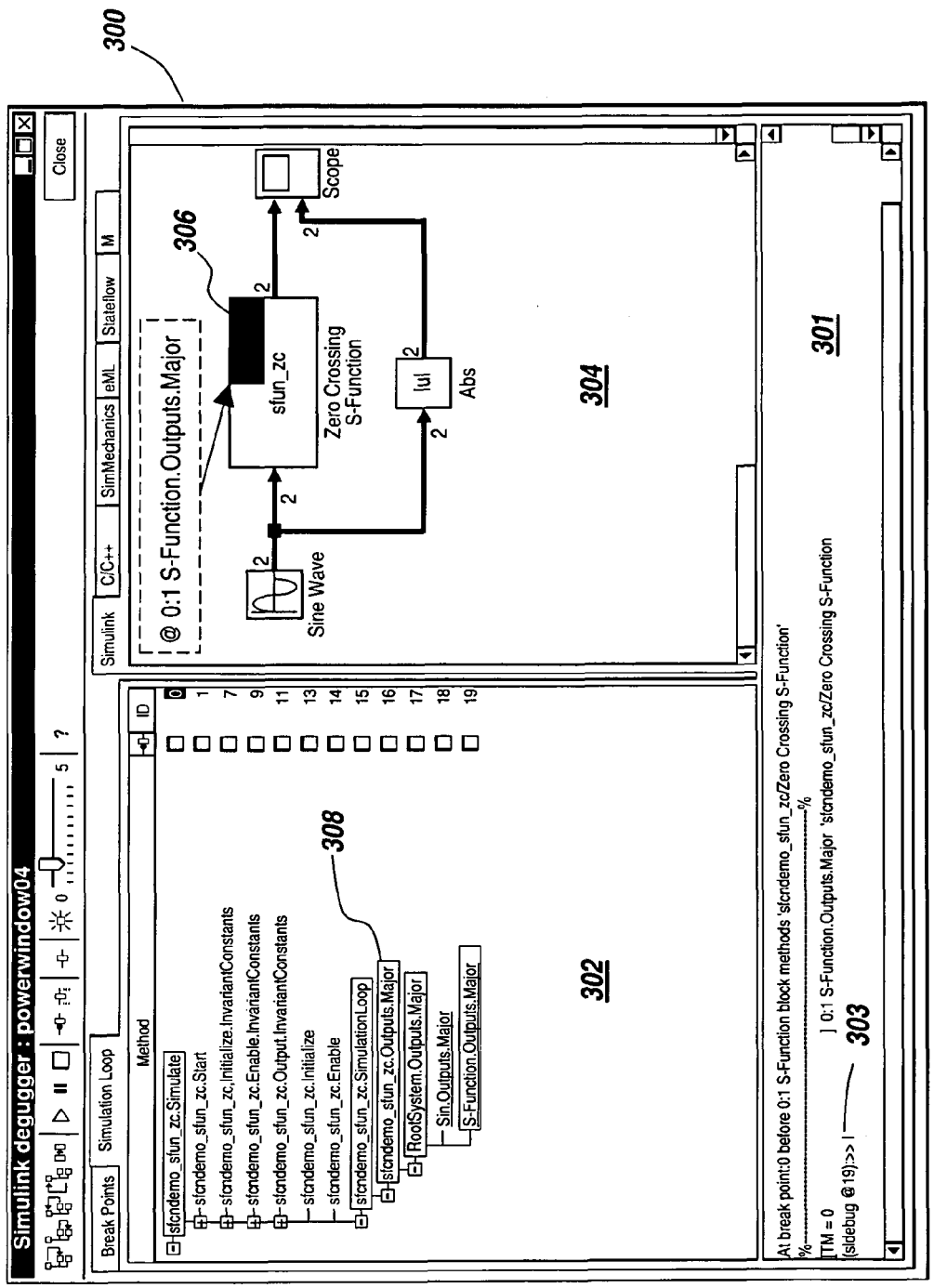
FIG. 4A is a depiction of a user interface employed by the illustrative embodiment of the present invention to present a model execution view and a block diagram model view.

FIG. 4A is a depiction of a user interface employed by the illustrative embodiment of the present invention to present a model execution view and a time-based block diagram model view. The display device 300 includes a model debugger view, 301, a model execution view 302, and a model view 304. The model debugger view 301 provides a command line 303 to accept user input. The model execution view 302 displays information about the elements of the time-based block diagram model such as the various methods that are currently being executed/simulated. The model view 304 is the user interface element that contains the graphical representation of the time-based block diagram. One of the entities in the model view 304 is an S-function block 306. The S-function block 306 includes the method outputs. major 308 listed in the model execution view 302. Upon encountering the S-function block 306, the Unified Debugger consults the DBO and identifies that the S-function block contains code compiled in a debuggable form. The Unified Debugger automatically transitions the views displayed to the user to an alternate set of views depicted in FIG. 4B.

Figure 4B:
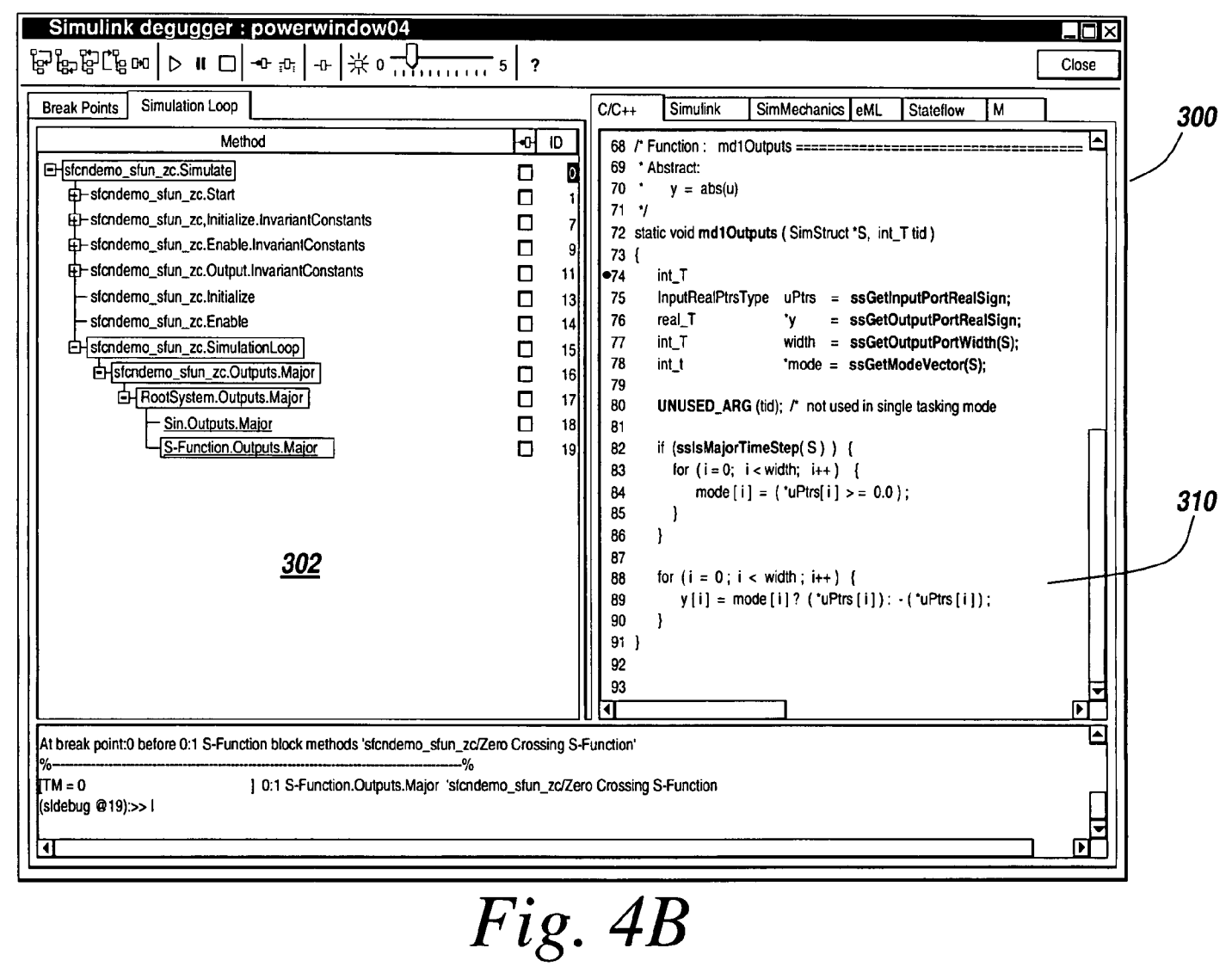

FIG. 4B includes the model execution view 302 and a source code view 310 representing the C/C++ source code of the S-function block 306. The Unified Debugger 200 includes the necessary features to continue execution of the source code without the user having to manually switch to a separate debugger for the C/C++ source code. Following the transition, the commands to step through the block methods that were being executed become commands to step through the source code that is displayed in the source code view 310 as long as the C/C++ source code view is the main view. The user has the option to switch back to other views including the SIMULINK block diagram model view 304 previously displayed in FIG. 4A. Once returning to the model view 304, the step command assumes the time-based block diagram functionality normally associated with a time-based block diagram view. Those skilled in the art will recognize that alternative views may be generated from other modeling domains such as by transitioning from a statechart view to a time-based block diagram view or vice versa.

Figure 4C:
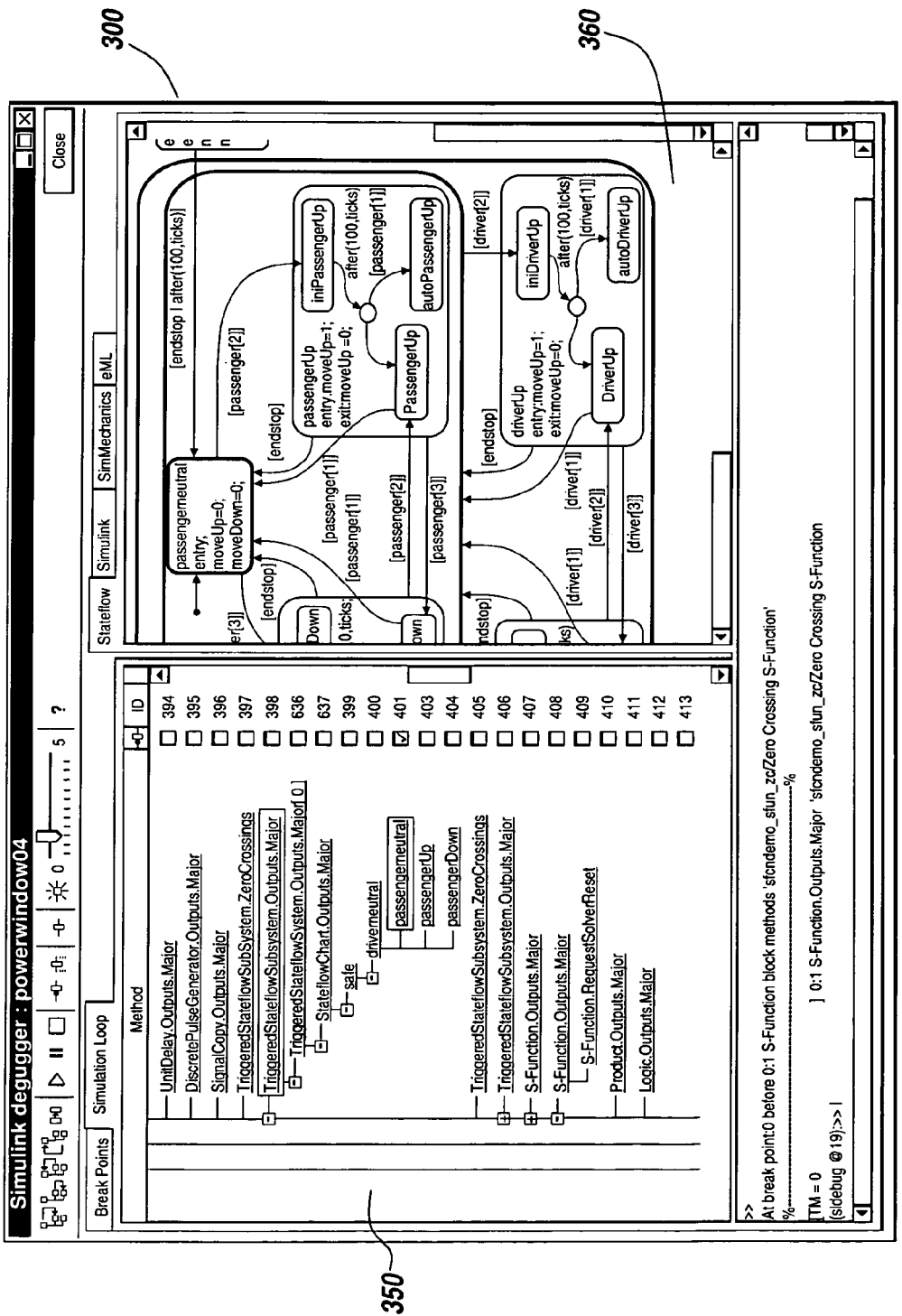
FIG. 4C is an alternative statechart view entered into by the illustrative embodiment of the present invention upon the execution entering a statechart entity in a block diagram.

An alternative view of a statechart modeling domain is depicted in FIG. 4C. FIG. 4C depicts a display device 300 showing an execution list view 350 and a statechart view 360. The execution list view 350 is arranged in a tree format and shows the methods called during model execution. A time-based block diagram view may be automatically switched by the Unified Debugger 200 to the statechart view 360 (depicted here as a STATEFLOW view) upon entering a statechart entity represented by a DBO in a time-based block diagram model. The properties of the view are customized for the particular modeling domain. Thus, in FIG. 4C there are no tabs displayed for source code operations such as C/C++ or MATLAB since the model did not contain any DBOs necessitating the creation of such views.

Figure 5A:
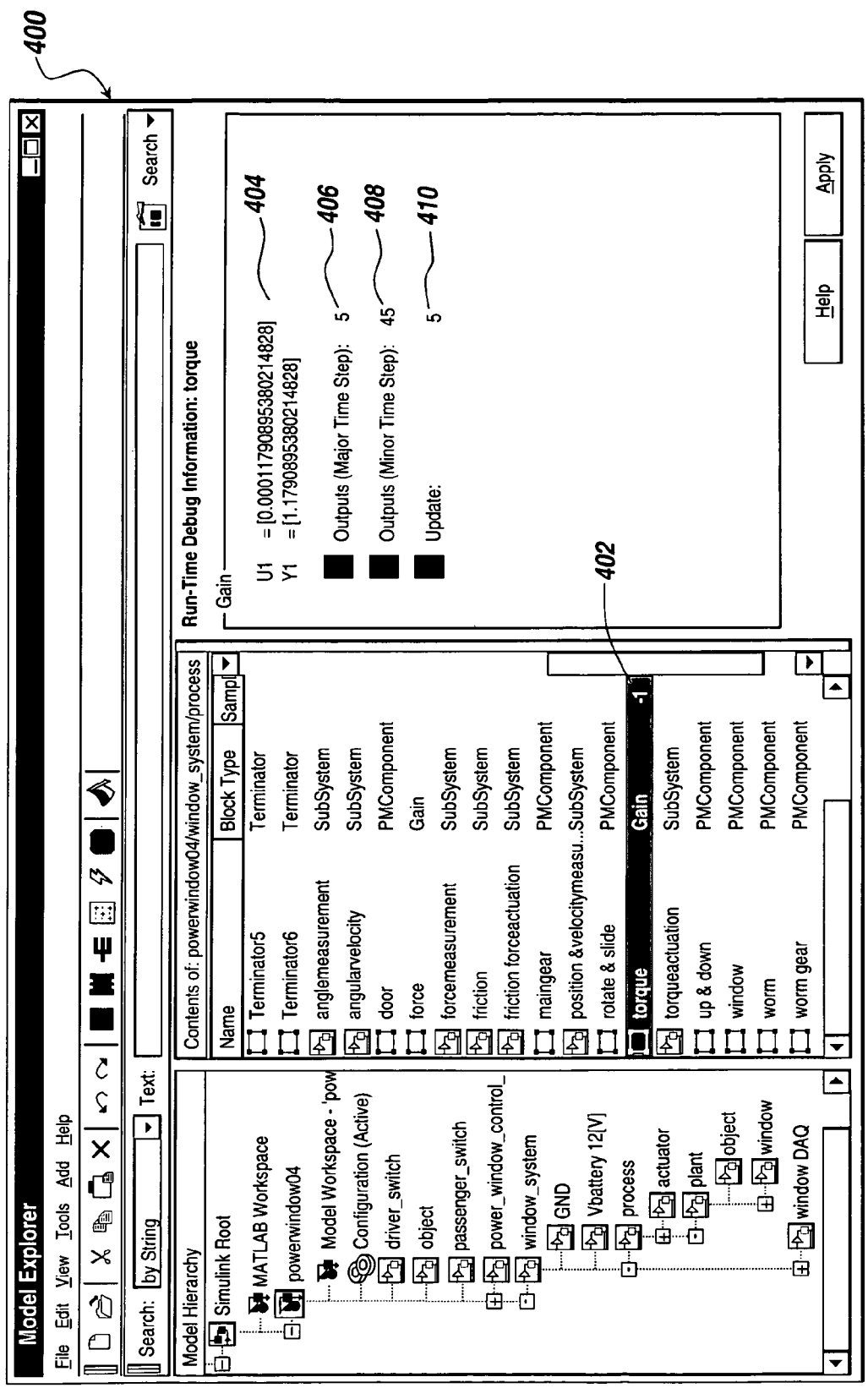
Figure 5B:
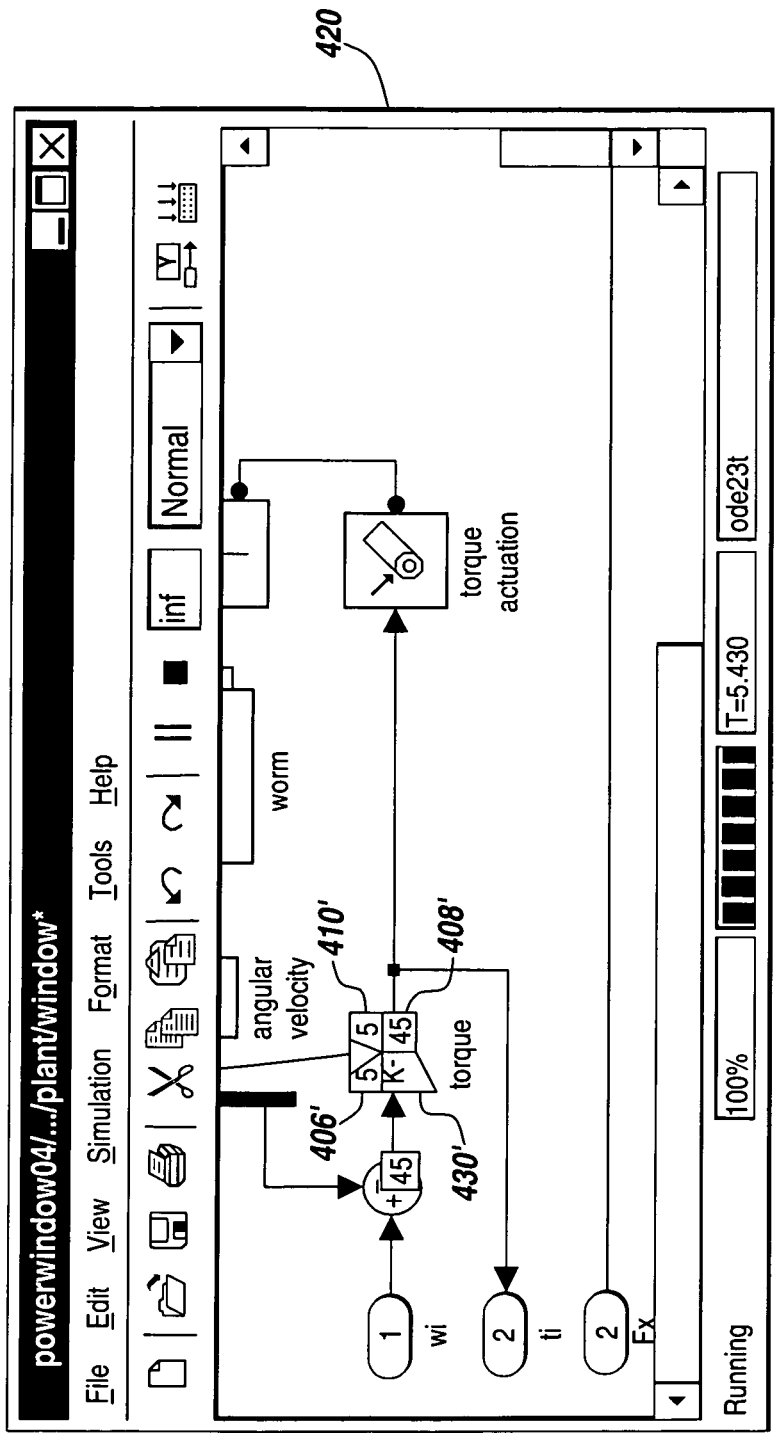

The Unified Debugger 200 synchronizes the values found in the different views as depicted in FIG. 5A. The model explorer view 400 displays debugging information 404 from the currently executing output method of the torque block 402. The debug information indicates the point in the current execution and indicates that there have been 5 major time steps 406, 45 minor time steps 408, and 5 updates 410 during the execution of the outputs method of the torque block. Major and minor time steps are used during simulation of models with continuous states by solvers. The minor time step is a subdivision of the major time step and is used to improve the accuracy of the major time step. A result is produced at the conclusion of each major time step. This debug information is synchronized in other views so that when the model view of the block diagram model is displayed, the debug information is shown in the model 420. FIG. 5B shows a model view which includes the torque block 430. The Unified Debugger superimposes the debug information 406', 408' and 410' corresponding to the debug information 404, shown in FIG. 5A. To the degree that the information is relevant in multiple views, the information is synchronized and displayed for the user in the alternate views. Those skilled in the art will recognize that some information that is displayed in some modeling domains is domain specific and therefore is not displayed in views of other modeling domains.

Figure 6A:
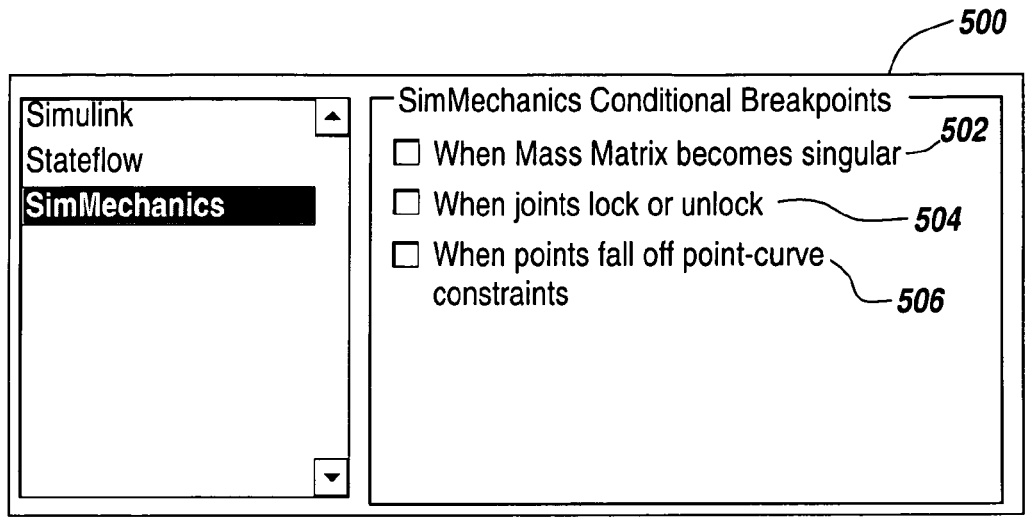
FIG. 6A depicts a user interface allowing graphical object specification information to be customized for a physical modeling domain.
Figure 6B:
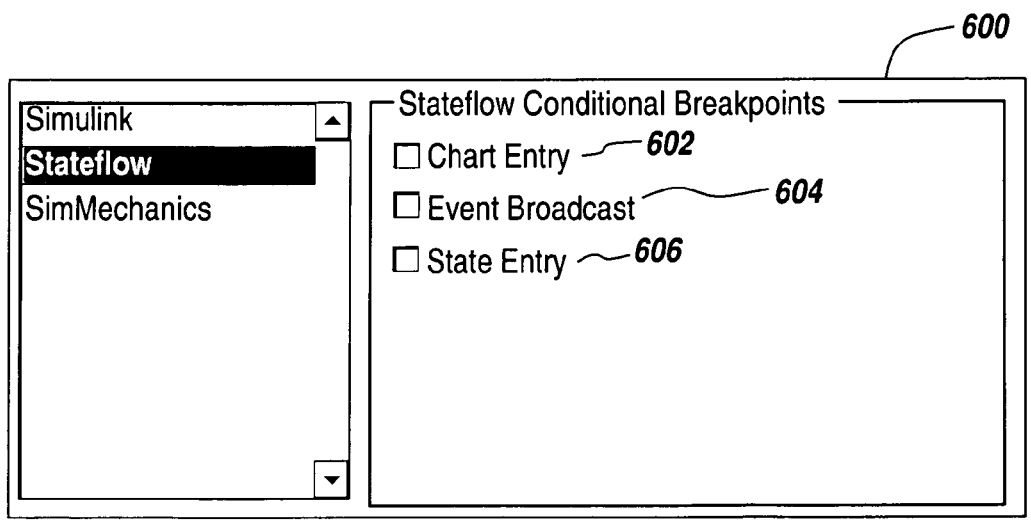
FIG. 6B depicts a user interface allowing graphical object specification information to be customized for a statechart modeling domain.

The illustrative embodiment of the present invention allows the Unified Debugger to display per graphical object specification information that is customized based on user choices for different modeling domains or DBOs. FIG. 6A shows available conditional break points that may be set for SIMMECHANICS DBOs. The user interface 500 indicates that breakpoints may be registered for points where mass matrices become singular 502, when joints lock or unlock 504, and when points fall off the point curve constraints 506 during execution of the SIMMECHANICS model. Similarly in FIG. 6B a user interface 600 for the STATEFLOW environment allows STATEFLOW conditional breakpoints to be set for chart entry 602, event broadcast 604 and state entries 606.

Figure 7:
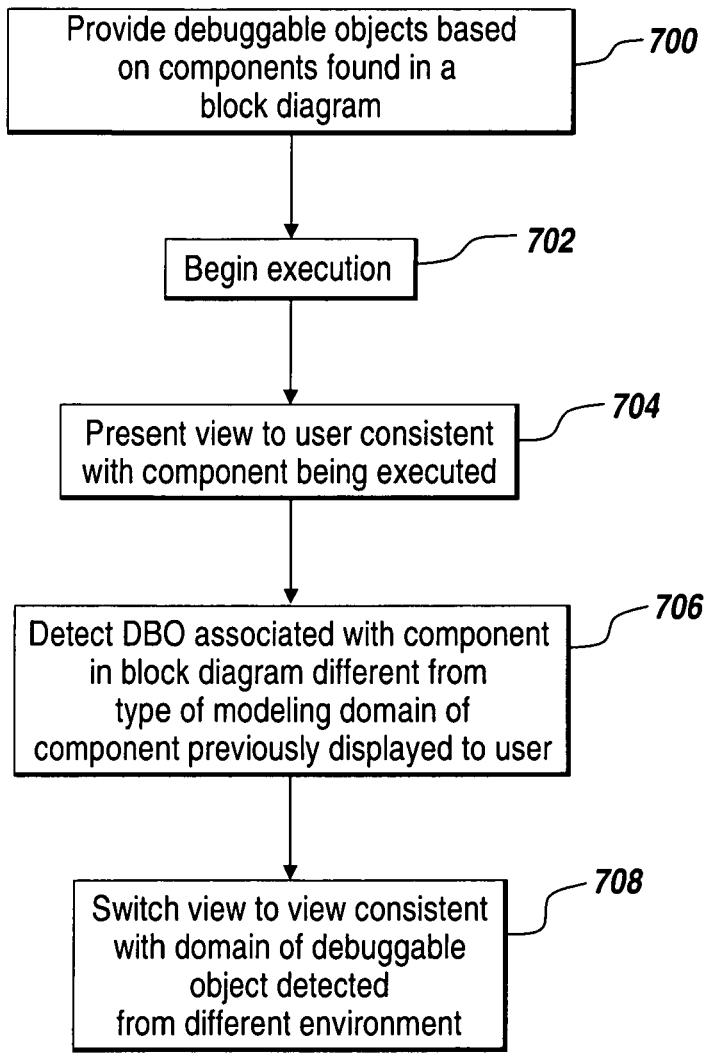
FIG. 7 is a flow chart of the sequence of steps followed by the illustrative embodiment of the present invention to debug a block diagram model with entities from different modeling domains.

FIG. 7 depicts the sequence of steps followed by the illustrative embodiment of the present invention to utilize the Unified Debugger to debug block diagram model entities from different modeling domains. The sequence begins when DBOs in the block diagram model are registered with the Unified Debugger during initialization of the execution (step 700). Subsequent to the registering of the DBOs, the execution of the block diagram model begins (step 702). The user is presented a displayed view that is consistent with the modeling domain of the entity that is currently being executed (step 704). In other words, if a time-based block diagram block is being executed, a time-based block diagram view is presented to the user. If the execution encounters a DBO for an entity indicating a statechart, a statechart view is displayed to the user. Similarly, DBOs indicating computer code or physical system modeling domains cause views consistent with those domains to be displayed to the user. Subsequently during the execution, the Unified Debugger encounters a DBO associated with an entity in the block diagram from a different modeling domain than the modeling domain of an entity currently being displayed to the user (step 706). Based on the detection of the DBO based on an entity from a different modeling domain, the Unified Debugger utilizes debugging features appropriate for the new modeling domain and the view is switched to a view consistent with the entity from the newly detected domain (step 708). For example, a time-based block diagram model being executed may display a time-based block diagram view to a user until such time as a step being executed causes a statechart to be entered. At that point, the Unified Debugger automatically switches to statechart debugging features and displays a statechart view to the user. The other views remain available to the user who is able to manually switch back at any time to one of the other views. As discussed above, the output data from the execution in the various views is synchronized.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more mediums as object code.

The illustrative embodiment has been described above for illustrative purposes relative to the technical computing environment of MATLAB and SIMULINK from The MathWorks, Inc. of Natick, Mass. Although the illustrative embodiment has been described relative to a MathWorks-based application, one of ordinary skill in the art will appreciate that the present invention may be applied to other graphical modeling environments and technical computing environments, such as any technical computing environments using software products of LabVIEW®, MATRIXx from National Instruments, Inc., Mathematica® from Wolfram Research, Inc., Mathcad of Mathsoft Engineering & Education Inc., Dymola from Dynasim AB, or Maple™ from Maplesoft, a division of Waterloo Maple Inc. Furthermore, one ordinarily skilled in the art will appreciate that the present invention may apply to any graphical modeling environment, such as one providing modeling with a Unified Modeling Language (UML), Hardware Description Language (HDL), or that provides a physics modeling domain.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. One or more non-transitory computer-readable media storing computer-executable instructions executable by a processor, the media storing one or more instructions for:
    providing a graphical model including:
        a first entity associated with a first modeling domain, wherein the first modeling domain is one of a statechart domain, a time-based block diagram domain, a physical system domain, a data flow diagram domain, a unified modeling language domain, a discrete event modeling domain, or a compiled code domain, and
        a second entity associated with a second modeling domain, wherein the second modeling domain is of a different type than the first modeling domain and is one of the statechart domain, the time-based block diagram domain, the physical system domain, the data flow diagram domain, the unified modeling language domain, the discrete event modeling domain, or the compiled code domain;
    providing a programming interface to a debugger;
    transferring information associated with the first entity via the programming interface to the debugger after executing the first entity;
    generating a first domain-specific debugger view of the graphical model, the generated first domain-specific debugger view consistent with the first modeling domain, the generating first domain-specific debugger view being based on the transferring information associated with the first entity;
    transferring information associated with the second entity via the programming interface to the debugger after executing the second entity;
    generating a second domain-specific debugger view of the graphical model, the generated second domain-specific debugger view consistent with the second modeling domain, the generating the second domain-specific debugger being based on the transferring information associated with the second entity;
    displaying the first domain-specific debugger view on a display device, where the first domain-specific debugger view is displayed:
        after the first entity is executed, and
        using a first user interface element;
    automatically transitioning to an updated domain display, the transitioning occurring when the second entity is executing; and
    displaying the second domain-specific debugger view on the display device, where the second domain-specific debugger view is displayed:
        based on the transitioning,
        after the second entity is executed, and
        using a second user interface element.

2. The non-transitory computer-readable media of claim 1 wherein the information associated with the first entity includes a first data value that is displayed in the first view and the information associated with the second entity includes a second data value that is displayed in the second view and wherein the media further stores one or more instructions for:
    synchronizing the first data value and the second data value to reflect a result of execution of the first entity or the second entity.

3. The non-transitory computer-readable media of claim 1 wherein the media further stores one or more instructions for:
    registering a method with the debugger via the programming interface; and
    receiving a call, via the programming interface, to the registered method from the debugger.

4. The non-transitory computer-readable media of claim 1 wherein the media further stores one or more instructions for:
    registering an event with the debugger via the programming interface; and
    directing the debugger, via the programming interface, to perform an action when the registered event occurs.

5. The non-transitory computer-readable media of claim 4 wherein the event is at least one of: an entry to a method, an exit from the method, a division by zero, a zero crossing, a negative square root, or an inconsistent state transition.

6. The non-transitory computer-readable media of claim 1 wherein the media further stores one or more instructions for:
    registering a command with the debugger; and
    receiving a call from the debugger to perform the command.

7. The non-transitory computer-readable media of claim 1 wherein the media further stores one or more instructions for:
    communicating to the debugger, via the programming interface, the communicating indicating how data associated with the first entity or the second entity is to be presented in the first domain-specific debugger view or the second domain-specific debugger view.

8. The non-transitory computer-readable media of claim 7 further comprising one or more instructions for:
    determining how data associated with the first entity or the second entity is to be presented in the first domain-specific debugger view or the second domain-specific debugger view by a schema.

9. The non-transitory computer-readable media of claim 1 wherein the programming interface is associated with a debuggable object.

10. The non-transitory computer-readable media of claim 1 further comprising one or more instructions for:
    displaying a list of one or more methods that are associated with the first entity.

11. The non-transitory computer-readable media of claim 1 further comprising one or more instructions for:
    displaying a list of one or more methods that are associated with the second entity.

12. The non-transitory computer-readable media of claim 1 wherein at least one of the first domain-specific debugger view or the second domain-specific debugger view includes a display of a call chain of methods that are called during an execution of the graphical model.

13. A computer-implemented method comprising:
providing a graphical model including:
a first entity associated with a first modeling domain, wherein the first modeling domain is one of a statechart domain, a time-based block diagram domain, a physical system domain, a data flow diagram domain, a unified modeling language domain, a discrete event modeling domain, or a compiled code domain, and
a second entity associated with a second modeling domain, wherein the second modeling domain is of a different type than the first modeling domain and is one of the statechart domain, the time-based block diagram domain, the physical system domain, the data flow diagram domain, the unified modeling language domain, the discrete event modeling domain, or the compiled code domain;
providing a programming interface to a debugger;
transferring information associated with the first entity via the programming interface to the debugger after executing the first entity;
generating a first domain-specific debugger view associated with the graphical model, the generated first domain-specific debugger view consistent with the first modeling domain, the generating first domain-specific debugger view being based on the transferring information associated with the first entity;
transferring information associated with the second entity via the programming interface to the debugger after executing the second entity;
generating a second domain-specific debugger view associated with the graphical model, the generated second domain-specific debugger view consistent with the second modeling domain, the generating the second domain-specific debugger being based on the transferring information associated with the second entity;
displaying the first domain-specific debugger view on a display device, where the first domain-specific debugger view is displayed:
after the first entity is executed, and
using a first user interface element;
automatically transitioning to an updated domain display, the transitioning occurring when the second entity is executing; and
displaying the second domain-specific debugger view on the display device, where the second domain-specific debugger view is displayed:
based on the transitioning,
after the second entity is executed, and
using a second user interface element.

14. The method of claim 13 wherein the information associated with the first entity includes a first data value that is displayed in the first domain-specific debugger view and the information associated with the second entity includes a second data value that is displayed in the second domain-specific debugger view and wherein the method further comprises:
synchronizing the first data value and the second data value to reflect a result of an execution of the first entity or the second entity.

15. The method of claim 13 further comprising:
registering a method with the debugger via the programming interface; and
receiving a call, via the programming interface, to the registered method from the debugger.

16. The method of claim 13 further comprising:
registering an event with the debugger via the programming interface; and
directing the debugger, via the programming interface, to perform an action when the registered event occurs.

17. The method of claim 13 further comprising:
registering a command with the debugger; and
receiving a call from the debugger to perform the registered command.

18. The method of claim 13 further comprising:
communicating to the debugger, via the programming interface, the communicating indicating how data associated with the first entity or the second entity is to be displayed.

19. The method of claim 13 wherein at least one of the first domain-specific debugger view or the second domain-specific debugger view includes a display of a list of methods associated with the graphical model.

20. The method of claim 19 wherein a method in the list of methods is highlighted to indicate that the method is currently being executed.

21. The method of claim 19 wherein the list of methods are displayed in a hierarchical arrangement.

22. The method of claim 13 wherein at least one of the first domain-specific debugger view or the second domain-specific debugger view includes a display of a call chain of methods that are called during an execution of the graphical model.

23. The method of claim 22 wherein the call chain includes one or more names associated with the called methods.

24. The method of claim 23 wherein a name associated with a currently executed method is highlighted in the display of the call chain to indicate that the method is executing.

25. The method of claim 22 wherein the displayed call chain of called methods is highlighted.

26. An apparatus comprising:
means for providing a graphical model including:
a first entity associated with a first modeling domain, wherein the first modeling domain is one of a statechart domain, a time-based block diagram domain, a physical system domain, a data flow diagram domain, a unified modeling language domain, a discrete event modeling domain, or a compiled code domain, and
a second entity associated with a second modeling domain, wherein the second modeling domain is of a different type than the first modeling domain and is one of the statechart domain, the time-based block diagram domain, the physical system domain, the data flow diagram domain, the unified modeling language domain, the discrete event modeling domain, or the compiled code domain;
means for providing a programming interface to a debugger;
means for transferring information associated with the first entity via the programming interface to the debugger after executing the first entity;
means for generating a first domain-specific debugger view of the graphical model, the generated first domain-specific debugger view consistent with the first modeling domain, the generating first domain-specific debugger view being based on the transferring information associated with the first entity;
means for transferring information associated with the second entity via the programming interface to the debugger after executing the second entity;
means for generating a second domain-specific debugger view of the graphical model, the generated second domain-specific debugger view consistent with the second modeling domain, the generating the second domain-specific debugger being based on the transferring information associated with the second entity;

means for displaying the first domain-specific debugger view on a display device, where the first domain-specific debugger view is displayed:
    after the first entity is executed, and
    using a first user interface element;

means for automatically transitioning to an updated domain display, the transitioning occurring when the second entity is executing; and means for displaying the second domain-specific debugger view on the display device, where the second domain-specific debugger view is displayed:
    based on the transitioning,
    after the second entity is executed, and
    using a second user interface element.

27. A system comprising:
a display device; and
a processor to:
provide a graphical model including:
    a first entity associated with a first modeling domain, wherein the first modeling domain is one of a statechart domain, a time-based block diagram domain, a physical system domain, a data flow diagram domain, a unified modeling language domain, a discrete event modeling domain, or a compiled code domain, and
    a second entity associated with a second modeling domain, wherein the second modeling domain is of a different type than the first modeling domain and is one of the statechart domain, the time-based block diagram domain, the physical system domain, the data flow diagram domain, the unified modeling language domain, the discrete event modeling domain, or the compiled code domain;
provide a programming interface to a debugger;
transfer information associated with the first entity via the programming interface to the debugger after executing the first entity;
generate a first domain-specific debugger view of the graphical model, the generated first domain-specific debugger view consistent with the first modeling domain, the generating first domain-specific debugger view being based on the transferring information associated with the first entity;
transfer information associated with the second entity via the programming interface to the debugger after executing the second entity;
generate a second domain-specific debugger view of the graphical model, the generated second domain-specific debugger view consistent with the second modeling domain, the generating the second domain-specific debugger being based on the transferring information associated with the second entity;
display the first domain-specific debugger view on the display device, where the first domain-specific debugger view is displayed:
    after the first entity is executed, and
    using a first user interface element;
automatically transition to an updated domain display, the transitioning occurring when the second entity is executing; and
display the second domain-specific debugger view on the display device, where the second domain-specific debugger view is displayed:
    based on the transitioning,
    after the second entity is executed, and
    using a second user interface element.

28. One or more non-transitory computer-readable media storing computer-executable instructions executable by a processor, the media storing one or more instructions for:
identifying a call chain of methods that are called during an execution of a graphical model, the graphical model under control of a multi-domain unified debugger that enables the debugging of the graphical model, where:
    the graphical model includes:
        a first entity associated with a first modeling domain of a plurality of different types of modeling domains, and
        a second entity associated with a second modeling domain of the plurality of different types of modeling domains,
    the different types of modeling domains include a statechart domain, a time-based block diagram domain, a physical system domain, a data flow diagram domain, a unified modeling language domain, a discrete event modeling domain, or a compiled code domain,
    the call chain indicates an execution order of the methods associated with the first entity and the second entity,
    the first entity and the second entity are associated with a programming interface, and
    the programming interface allows access to information associated with the first entity and the second entity;
transferring information associated with the first entity via the programming interface to the multi-domain unified debugger after executing the first entity;
generating a first domain-specific debugger view of the graphical model, the generated first domain-specific debugger view consistent with the first modeling domain, the generating first domain-specific debugger view being based on the transferring information associated with the first entity;
transferring information associated with the second entity via the programming interface to the debugger after executing the second entity;
generating a second domain-specific debugger view of the graphical model, the generated second domain-specific debugger view consistent with the second modeling domain, the generating the second domain-specific debugger being based on the transferring information associated with the second entity;
displaying the first domain-specific debugger view on a display device, where the first domain-specific debugger view is displayed:
    after the first entity is executed,
    concurrently with the identified call chain, and
    using a first user interface element;
automatically transitioning to an updated domain display, the transitioning occurring when the second entity is executing; and
displaying the second domain-specific debugger view on the display device, where the second domain-specific debugger view is displayed:
    based on the transitioning,
    after the second entity is executed,
    concurrently with the identified call chain, and
    using a second user interface element.

29. The non-transitory computer-readable media of claim 28 wherein the displayed call chain includes one or more names associated with the called methods.

30. The non-transitory computer-readable media of claim 29 further comprising one or more instructions for:
    displaying one or more names associated with one or more other methods associated with the graphical model that are not called during the execution of the graphical model.

31. The non-transitory computer-readable media of claim 30 wherein, the one or more names associated with the one or more other methods are displayed differently than the one or more names associated with the methods in the call chain to distinguish the methods in the call chain from the one or more other methods.

32. The non-transitory computer-readable media of claim 31 wherein the names associated with the methods in the call chain are highlighted to distinguish the methods in the call chain from the one or more other methods.

33. The non-transitory computer-readable media of claim 28 further comprising one or more instructions for:
    maintaining the call chain in a database.

34. The non-transitory computer-readable media of claim 28 wherein the call chain is displayed as a UML diagram.

* * * * *